Patented Jan. 23, 1945

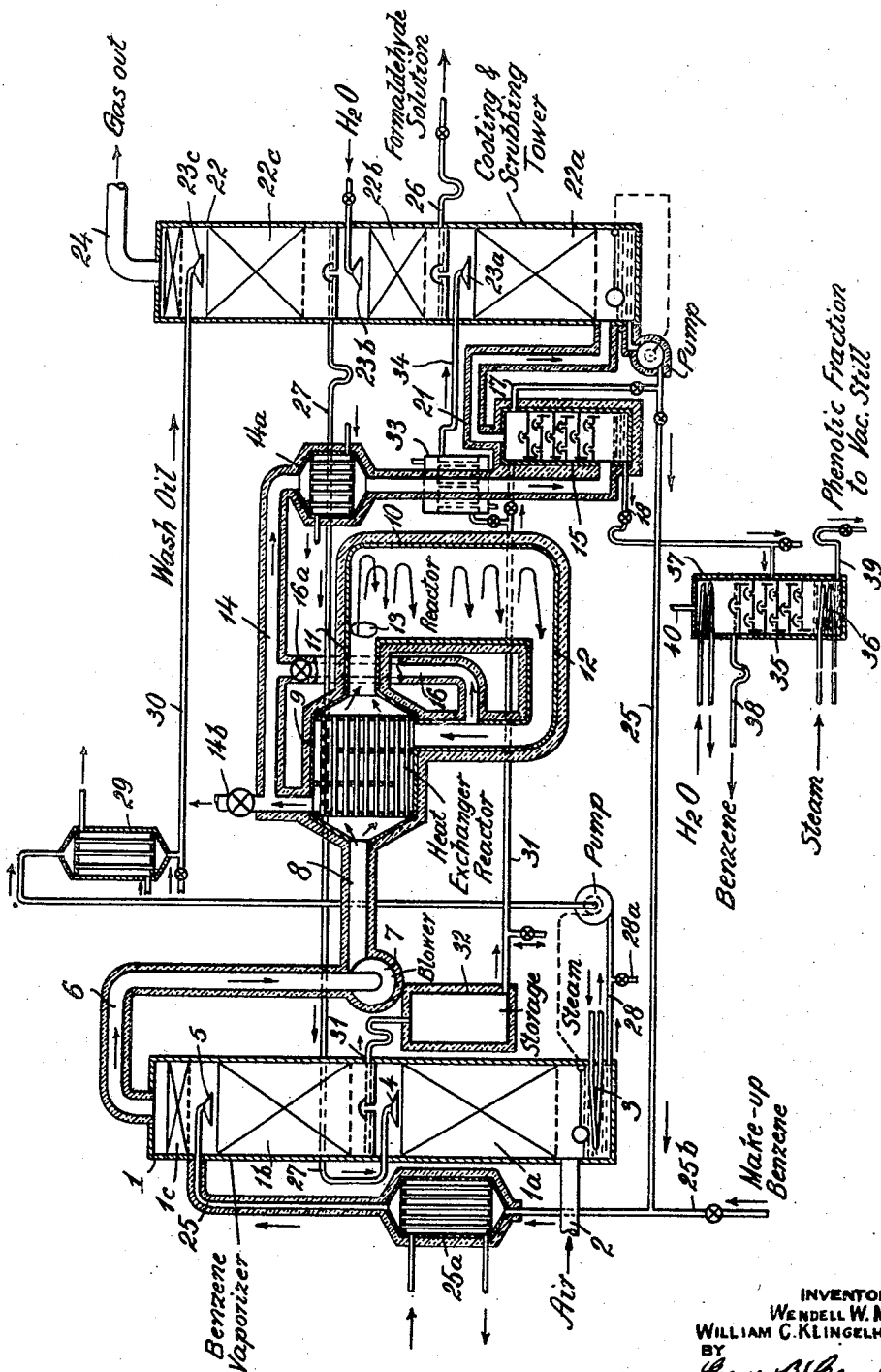

2,367,731

UNITED STATES PATENT OFFICE 2,367,731

RECOVERY OF PHENOL

Wendell W. Moyer, Decatur, Ill., and William C. Klingelhoefer, Van Buren, N. Y., assignors to The Solvay Process Company, New York, N. Y., a corporation of New York Application December 2, 1940, Serial No. 368,264

11 Claims. (Cl. 260—621)

This invention relates to the recovery of phenol from vapor mixtures formed by the vapor phase oxidation of benzene by means of oxygen-containing gases.

The invention is particularly directed to a recovery method which effects recovery of phenol without chemical reaction thereof with alkalis.

In application Serial No. 167,252, filed October 4, 1937, by Wendell W. Moyer and William C. Klingelhoefer, of which the present application is in part a continuation, there is described and claimed a process for the manufacture of phenol by subjecting benzene to oxidation by means of an oxygen-containing gas at normal atmospheric pressures or at higher or lower pressures, at elevated temperatures, and in the absence of catalytically effective quantities or areas of oxidation-promoting catalysts. The recovery process of the present invention is especially adapted for the treatment of reaction mixtures of such processes.

In United States Patent 1,547,725 of C. H. Bibb, there is described a process for the oxidation of benzene to phenol by means of air using a gaseous catalyst. The recovery process of the invention is also applicable to recovery of phenol from reaction mixtures obtained in such processes.

In accordance with the present invention, reaction vapor mixtures of the types discussed above are subjected to a washing treatment with an inert hydrophobic solvent for phenol, e. g. benzene.

By conducting the washing treatment at an elevated temperature, the phenol may be recovered from the reaction vapor mixture while retaining in vapor phase most of the non-phenolic content of the mixtures. In conducting the process at pressures in the neighborhood of atmospheric pressure the reaction vapor mixture may be cooled in the phenol recovery unit to a temperature of about 50° C. or slightly thereabove. At higher pressures correspondingly higher temperatures may be employed.

In general reaction mixtures of the type involved in the present invention may be obtained by reacting elemental oxygen gas, which may be diluted with inert gases or vapors such as nitrogen, carbon dioxide, or steam, with benzene by subjecting a mixture of oxygen and benzene vapor in a mol or volume ratio of oxygen to benzene between about 0.02 and 0.8 to a temperature between 200° and 1000° C. at absolute pressures from as high as 1000 atmospheres down to as low as ½ atmosphere or less.

Atmospheric pressure operations involving, for example, absolute pressures between ½ atmosphere and 2 atmospheres may be conducted to advantage in the absence of catalysts, at temperatures between 600° and 800° C. using air and benzene vapor in a mol ratio of air to benzene between 0.5 and 1.5.

It is preferred to effect recovery of phenol by counter-current direct contact cooling or scrubbing with hydrocarbon liquid at a pressure between ½ atmosphere and 2 atmospheres (abs.) in a gas temperature range from between 70° C. and 100° C. at gas inlet down to between 50° C. and 60° C. at gas outlet using liquid at a liquid inlet temperature between 40° C. and 60° C. and a liquid outlet temperature between 70° C. and 100° C.

Benzene is an especially satisfactory hydrophobic phenol solvent since it is readily separable from phenol by fractional distillation and since it already constitutes a large proportion of the reaction vapor mixture and hence its use as solvent entails no extra steps for recovering solvent vaporized by the hot vapor mixture in the absorber or scrubber.

By countercurrent washing with benzene in the manner described above, all but a very small proportion of the phenol content of the reaction mixture is recovered in the absorber-scrubber. The flow of benzene and phenol countercurrent to the hot vapor mixture serves to concentrate the phenol and by proper regulation of the temperatures, as described above, the phenol may be recovered in admixture with sufficient benzene so as to provide a product sufficiently fluid for easy handling at the temperatures involved. The optimum concentration is dependent upon the pressure since at high recovery pressures correspondingly high recovery temperatures may be used at which, for a given concentration of phenol, the product is more fluid.

After separation of phenol from the reaction vapor mixture, the residual mixture may be treated to recover other constituents contained therein. A satisfactory method of treatment involves cooling the vapor mixture by direct contact with a cooling liquid, for example benzene. By cooling the vapor mixture in this manner to a temperature around 30° C. most of the benzene and less volatile reaction products still present may be removed from the vapor mixture. Thus, any residual phenol, diphenyl, naphthalene and terphenyl, and most of the benzene are removed.

There follows an example of one embodiment of the present invention.

In the accompanying drawing the numeral 1 designates a contact tower containing suitable packing and arranged for introducing benzene into air to be employed in the process. The tower may be constructed of any convenient material, steel for example, and the packing may be of similar or dissimilar material.

The tower 1 is provided with a lower section 1—a for stripping benzene from an oil-benzene solution and an upper section 1—b for saturating the air with additional benzene. At the bottom of the tower an air inlet 2 is provided so that air introduced into the tower passes up therethrough countercurrent to descending streams of oil and benzene in section 1—a and benzene in section 1—b. Each of these sections may be provided with suitable packing to assure adequate surface contact of the liquid with the gas. At the bottom of the tower a steam coil 3 may be arranged for heating oil and exhausting it of its benzene content. Hot benzene-oil mixture is introduced into section 1—a by means of spray head 4 and benzene is introduced into section 1—b by means of spray head 5. An additional packed section 1—c may be arranged at the top of the tower for removing any entrained spray from the gas. From the top of the tower 1 gas conduit 6 leads to blower 7 adapted to force the air-benzene vapor mixture through the system. Blower 7 is connected by conduit 8 to a heat exchanger 9 which serves as the initial section of the reaction chamber. This heat exchanger is shown as a tubular interchanger of the indirect type which may be constructed of a material such as aluminum-coated chromium-iron. Heat exchanger 9 is connected directly to a reaction chamber 10 of any suitable type such as to provide the required reaction time while exposing the gases to a minimum of contact surface. The reactor illustrated comprises a cylindrical chamber having a tangential inlet 11 and tangential outlet pipe 12 so that the gases are given a spiral motion and hence any dead spots are avoided and the gas moves progressively through the reactor. A steel vessel lined with ceramic material such as fused silica may be used. At the top of the reaction chamber a gas inlet pipe 13 is shown for introducing combustion gas or other heating medium for initially bringing the reaction chamber to operating temperature. Pipe 12 leads directly from the reactor into the hot side of preheater 9 which thus serves to transfer heat from the reaction products to the ingoing reaction mixture.

Conduit 14 leads from the hot side of the interchanger 9 through a cooler 14—a, cooled by any suitable fluid and arranged to give uniform temperature control, to the bottom of a conventional bubble tray column 15. Outlet pipe 14—b is provided for drawing off the hot gas used for initially heating the reactor. Between pipes 12 and 14 a by-pass 16 having a regulating valve 16—a is arranged to shunt the heat exchanger 9 so as to control the temperature in the reaction zone within the desired range.

Column 15 has an inlet 17 for benzene at the top and an outlet 18 for condensate at the bottom. Gas conduit 21 leads from the top of the bubble tray column to the bottom of a scrubbing tower 22.

Scrubbing tower 22 comprises a lower section 22—a wherein the gases are cooled by countercurrent contact with benzene, a section 22—b wherein the cooled gases are washed with water for removal of formaldehyde, and a section 22—c wherein the cooled gases are finally scrubbed with wash oil such as the straw oil employed for absorbing benzene from coke oven gases. The several sections of the tower are provided with suitable packing and spray heads 23—a, 23—b, and 23—c for introducing the scrubbing fluids. From the top of the scrubbing tower gas conduit 24 leads to suitable gas disposal means. Since the gas resulting from the process has some fuel value, it may be used for various heating purposes. Column 15 and tower 22 may be constructed of alloy steels resistant to corrosion, such as the chromium or chromium nickel steels.

From the bottom of section 22—a of the scrubbing tower pipe 25 leads through a heat exchanger 25—a to spray head 5 in tower 1; branch 17 leads to the top of column 15. A valved inlet 25—b for make-up benzene is provided on this line. At the bottom of section 22—b a pipe 26 is provided for drawing off aqueous formaldehyde solution. Arrangement may be made for recirculating this solution to build up its formaldehyde content if desired. However, straight countercurrent circulation provides a more satisfactory recovery. From the bottom of section 22—c a pipe 27 leads to spray head 4 in section 1—a of tower 1.

Tower 1 at its bottom has a liquid outlet pipe 28 provided with a valved outlet branch 28—a. Pipe 28 leads to cooler 29 connected to oil inlet pipe 30 of scrubbing section 22—c. From section 1—b of tower 1 outlet pipe 31 leads to storage tank 32 and thence to the top of bubble tray column 15 and also to a heat exchanger 33 from which the pipe line 34 leads to spray head 23—a of section 22—a.

Outlet pipe 18 from column 15 leads to the center of a distillation column 35. This column may be of conventional construction having a heating coil 36 at the bottom and a cooling coil 37 at the top and outlets 38 and 39 at the top and bottom respectively for withdrawal of distillate and distillation residue. Vapor outlet 40 is provided for exit of any uncondensed gases.

While contact devices of the packed tower type have been illustrated in the drawing, other contact means may be used to advantage. Thus spray contact devices of low pressure drop, such as the spray roll contact apparatus of United States Patent 1,958,586 of Stuart Parmelee Miller, or the various contact apparatuses of Miller Patent 1,958,440 may be employed to particular advantage because of their high efficiency and low operating cost. When such an apparatus is employed, it may be advantageous to provide the requisite heating or cooling coils for heating or cooling the gases within the spray chamber itself, say at the bottom thereof, so that efficient heat exchange is obtained.

The apparatus illustrated may be operated for the production of phenol from benzene in the following manner.

Air enters tower 1 by means of inlet 2 and passes up through section 1—a countercurrent to flow of benzene and stripping oil mixture whereby the air vaporizes the benzene from the mixture. The air and benzene-oil mixture both enter section 1—a at about 30° C. and it is desirable that the air enter the benzene vaporizing section 1—b at a temperature around 50° C. or 60° C. Oil collecting at the bottom of the tower may be heated by steam coil 3 in order to further remove benzene, and the resultant oil freed of the benzene may be returned by pipe 28 to cooler 29 for reuse as stripping oil in a manner to be hereinafter described. By regulating the heating of the body of oil a portion of the oil may be vaporized to supply the necessary heat for raising the temperature of the air and also for vaporizing the benzene. The oil vaporized will be cooled by the air and condensed and will return to the bottom of the tower.

The air containing vapors of benzene from the benzene-stripping oil mixture next passes through section 1—b of tower 1 where it contacts countercurrently with benzene introduced through spray head 5 and preheated in preheater 25—a to a temperature around 60° C. The benzene may be a crude product containing the impurities normally associated therewith as it has been found that such impurities do not adversely affect the reaction. In this manner a mixture of air and benzene vapor in about equimolecular proportions is produced at a temperature around 55° C. or 60° C. Excess benzene, not vaporized by the air, passes out at the bottom of section 1—b through pipe 31 to storage tank 32. Air-benzene vapor mixture drawn by pump 7 at a rate such as to give a space velocity of 350 or thereabouts in that part of the heat exchanger 9 and reactor 10 maintained above 500° C. (corresponding to a reaction time of about 2½ to 3½ seconds) passes to heat exchanger 9 where its temperature is raised to about 600° C. The mixture then enters reactor 10 where by the heat of reaction it is further heated to about 800° C. At 800° C. the reaction mixture enters the hot side of heat exchanger 9 and gives up its heat to ingoing mixture thus being cooled to about 260° C.

The reaction mixture is further cooled in heat exchanger 14—a to about 85° C. and enters column 15 at this temperature. In column 15 the reaction mixture passes upwardly countercurrent to a flow of benzene, which is introduced at the top of the tower at a temperature around 40° C. This benzene may be supplied either from storage tank 32 by way of pipe 31 or from tower 22 by way of pipe 25 and branch pipe 17. The contact of the reaction gas mixture with the cooler benzene results in the condensation or absorption of phenol, diphenyl, naphthalene, and other materials relatively high-boiling, compared with the benzene. It is preferred to control the entering gas temperature and the entering benzene temperature and the amount of benzene supplied so as to cool the gases to a temperature of about 58° C. and heat the liquid to about 85° C. A phenolic condensate mixture is thus obtained containing about 50 mol percent of benzene. This condensate may contain a small proportion of aqueous condensate condensed in column 15 or introduced along with benzene from tower 22. This mixture may be caused to flow through pipe 18 to a distillation column 35 for separation of benzene and aqueous condensate from high-boiling constituents. The phenolic residue, consisting of 80 parts phenol and the balance diphenyl, naphthalene, and other products perhaps resulting from the condensation of phenol with formaldehyde present in the reaction gases, may be withdrawn from the bottom of column 35 and conducted to a vacuum still (not shown) for recovery of phenol therefrom. The benzene recovered may be returned to the system for further use.

The reaction gases pass from the top of column 15 to scrubbing tower 22. Here they first are brought into intimate contact countercurrently with benzene introduced through spray head 23—a. This benzene may be drawn by way of pipes 31 and 34 from storage tank 32 or partly or entirely from some other source, as the fresh benzene supply, but is preferably introduced into section 22a of the tower at a temperature around 29° C. Sufficient benzene should be introduced to cool the gas mixture down to about 30° C., additional benzene being supplied, if required, for this purpose. By this cooling of the gases the major portion of the benzene is condensed and collected at the bottom of section 22—a from whence it may be conducted by means of pipe 25 back through preheater 25—a to spray head 5 and after the addition of make-up benzene through branch 25—b, if necessary. Whether this addition will or will not be necessary in any particular case of course depends upon whether additional benzene has been supplied through pipe 31 and also whether benzene from the bottom of section 22—a is being used for supplying column 15.

It will be noted that any constituents such as phenol, diphenyl, etc. not recovered in column 15 will be washed out from the gases with the benzene in section 22—a. By supplying benzene from this section to the column 15, any such constituents contained will be recovered along with the phenol, diphenyl, etc. condensed from the gases in this column. A similar result eventually takes place with benzene circulated back to tower 1 by way of return pipe 25. Even if such constituents are vaporized in section 1—b, their relative proportion in the gas mixture will be negligible compared with the quantities produced by the reaction and consequently they will pass along through the system without any substantial effect upon its operation.

Reaction gases cooled to a temperature around 30° C. in section 22—a, pass into section 22—b where they are washed countercurrently with water for removal of formaldehyde. The amount of water is controlled to produce a solution of about 10% formaldehyde concentration. The resultant formaldehyde solution is drawn off through pipe line 26. The gases then pass up through section 22—c where they are washed counter-currently with wash oil introduced through spray head 23—c. This oil may be a petroleum distillate fraction such as the straw oil commonly employed at coke oven plants for recovering benzene. The wash oil should be introduced at as low a temperature as possible in order to effect a maximum elimination of benzene from the gases. Fresh wash oil and wash oil recovered from the bottom of section 1—a of tower 1 and cooled in heat exchanger 29 to a temperature of about 30° C. or lower may be used advantageously. In this way the benzene content of the exit gases can be reduced to as low as .1% or lower. Analyses have shown such gases to contain on the order of 15% carbon monoxide together with a few percent of hydrogen, methane, and ethylene. Consequently these gases possess appreciable heating value and can be used for heating purposes.

We claim:

1. In the recovery of phenol from the vapor mixture formed by the vapor phase oxidation of benzene to phenol at elevated temperatures, the improvement which comprises bringing the resultant reaction mixture into direct and intimate contact with benzene to remove phenol therefrom at an elevated temperature sufficient to retain in vapor phase most of the non-phenolic content of the reaction mixture.

2. In the recovery of phenol from a reaction vapor mixture obtained by passing a mixture of benzene vapor and air in a volume ratio of air to benzene vapor between 0.1 and 4 through a reaction zone maintained at a temperature between 325° C. and 800° C., the improvement which comprises bringing the resultant reaction mixture into direct and intimate contact with benzene to remove phenol therefrom at an elevated temperature sufficient to retain in vapor phase most of the non-phenolic content of the reaction mixture.

3. The method of producing phenol from benzene, which comprises passing a mixture of benzene vapor and air in a volume ratio of air to benzene vapor between 0.1 and 4 through a reaction zone maintained at a temperature between 325° C. and 800° C., said zone zeing devoid of catalytic contact masses and gaseous oxidation catalysts, and bringing the resultant recation mixture into direct and intimate contact with benzene to remove phenol therefrom at an elevated temperature sufficient to retain in vapor phase most of the non-phenolic content of the reaction mixture.

4. In the recovery of phenol from the vapor mixture formed by the vapor phase oxidation of benzene to phenol at elevated temperatures, the improvement which comprises washing the reaction vapor mixture containing phenol with benzene at about atmospheric pressure and at a temperature above 50° C., cooling the washed mixture to condense benzene and using at least a part of the thus recovered benzene as wash liquid for washing phenol from additional reaction vapor mixture.

5. In the recovery of phenol from the vapor mixture formed by the vapor phase partial oxidation of benzene to phenol by subjecting to a temperature between about 600° C. and 800° C. at a pressure between about ½ and about 2 atmospheres absolute a mixture of benzene vapor and oxygen-containing gas containing a volume ratio of elemental oxygen to benzene vapor between about 0.02:1 and about 0.8:1, the improvement which comprises washing the reaction vapor mixture countercurrently with benzene while the vapor mixture is yet at a temperature between 50° C. and 100° C. thereby removing phenol from the vapor mixture while retaining benzene in vapor phase.

6. In the recovery of phenol from the vapor mixture formed by the vapor phase partial oxidation of benzene to phenol by subjecting to a temperature between about 600° C. and 800° C. at a pressure between about ½ and about 2 atmospheres absolute a mixture of benzene vapor and oxygen-containing gas containing a volume ratio of elemental oxygen to benzene vapor between about 0.02:1 and about 0.8:1, the improvement which comprises cooling the hot reaction vapor mixture to a temperature only slightly above the dew point of phenol therein and passing the mixture into direct countercurrent contact with benzene initially at a temperature between 40° C. and 60° C. so as to cool the vapor mixture and remove phenol therefrom and so as to vaporize only part of the benzene, thereby forming a hot fluid mixture of benzene and phenol, and withdrawing the hot fluid mixture from the contact zone and recovering phenol therefrom.

7. In the production of phenol by vapor phase oxidation of benzene wherein a mixture of benzene vapor and a gas containing oxygen is treated at elevated temperatures to oxidize a portion of the benzene to phenol and phenol is recovered from the resulting gas-vapor mixture containing phenol and unoxidized benzene, that improvement which comprises washing said gas-vapor mixture containing phenol and benzene with liquid benzene at temperatures at which phenol is absorbed in the liquid benzene while most of the non-phenolic content of said gas-vapor mixture is retained in vapor phase, thereafter cooling the gas-vapor mixture leaving contact with said liquid benzene to temperatures at which the benzene therein is condensed, vaporizing benzene from the resulting liquid benzene condensate and mixing the vaporized benzene with an oxygen gas, and subjecting the mixture of benzene vapor and oxygen gas thus obtained to the aforementioned treatment to oxidize benzene to phenol.

8. In the production of phenol by vapor phase oxidation of benzene wherein a mixture of benzene vapor and a gas containing oxygen is treated at elevated temperatures to oxidize a portion of the benzene to phenol and phenol is recovered from the resulting gas-vapor mixture containing phenol and unoxidized benzene, that improvement which comprises washing said gas-vapor mixture containing phenol and benzene with liquid benzene passed in countercurrent flow and intimate contact with the gas-vapor mixture while maintaining the temperature of the gas-vapor mixture at 70° C. to 100° C. where it leaves contact with the liquid benzene and the temperature of the liquid containing benzene and phenol absorbed therein at 70° C. to 100° C. where this liquid leaves contact with the gas-vapor mixture, thereafter cooling the gas-vapor mixture leaving contact with said liquid benzene to temperatures at which the benzene therein is condensed, vaporizing benzene from the resulting liquid benzene condensate and mixing the vaporized benzene with an oxygen gas, and subjecting the mixture of benzene vapor and oxygen gas thus obtained to the aforementioned treatment to oxidize benzene to phenol.

9. In the production of phenol by vapor phase oxidation of benzene wherein a mixture of benzene vapor and a gas containing oxygen is treated at elevated temperatures to oxidize a portion of the benzene to phenol and phenol is recovered from the resulting gas-vapor mixture containing phenol and unoxidized benzene, that improvement which comprises washing said gas-vapor mixture containing phenol and benzene with liquid benzene at temperatures at which phenol is absorbed in the liquid benzene while most of the non-phenolic content of said gas-vapor mixture is retained in vapor phase, thereafter cooling the gas-vapor mixture leaving contact with said liquid benzene to temperatures at which the benzene therein is condensed, introducing a portion of the resulting liquid benzene condensate into contact with said gas-vapor mixture containing phenol and unoxidized benzene to provide, at least in part, the aforementioned liquid benzene with which this mixture is washed to remove phenol therefrom, vaporizing benzene from another portion of said liquid benzene condensate and mixing this vaporized benzene with a gas containing oxygen, and subjecting the mixed vapors of benzene and oxygen gas thus obtained to the aforementioned treatment to oxidize benzene to phenol.

10. In a process wherein liquid benzene is vaporized and the vapors mixed with a gas containing oxygen are treated at elevated temperatures to oxidize a portion of the benzene to phenol and the hot oxidation product gas is treated to recover therefrom phenol and to liquefy unreacted benzene, that improvement which comprises washing said oxidation product gas containing phenol and benzene with liquid benzene in two stages, in the first stage at temperatures at which phenol is absorbed in the liquid benzene while most of the non-phenolic content of said oxidation product gas is retained in vapor phase, and in the second stage at lower temperatures at which the benzene in said oxidation product gas is condensed, withdrawing from the process the phenol solution in benzene formed in the first of said stages, withdrawing the liquid benzene from contact with the oxidation product gas in said second stage, vaporizing in part the benzene contained therein and mixing the vaporized benzene with an oxygen gas, subjecting the resulting vapor-gas mixture to the aforementioned treatment to oxidize benzene to phenol and returning residual unvaporized benzene into contact with said oxidation products in at least one of the aforesaid stages wherein the oxidation product gas is washed with liquid benzene.

11. The process for the production of phenol by the vapor phase oxidation of benzene in admixture with oxygen at elevated temperatures which comprises continuously circulating benzene in a cyclic system wherein (1) liquid benzene is vaporized and mixed with a gas containing oxygen; (2) the gaseous mixture thus obtained is reacted at elevated temperatures to oxidize a portion of the benzene to phenol; (3) the resulting oxidation product gas is cooled in two stages, in the first stage to remove phenol therefrom and in the second stage to liquefy unreacted benzene; and (4) the liquefied benzene is recycled to step (1) in which the liquid benzene is vaporized; only partially vaporizing the liquid benzene supplied to step (1) and withdrawing from this step residual liquid benzene, cooling this liquid benzene and directly contacting it in the second of the aforementioned cooling stages with the oxidation product gas treated therein at temperatures low enough to liquefy the benzene in the product gas entering this cooling stage, returning a portion only of the liquid benzene leaving this second cooling stage to step (1), passing another portion of this liquid benzene in direct contact with the oxidation product gas in said first cooling stage at temperatures at which phenol is absorbed in the liquid benzene while most of the non-phenolic content of said oxidation product gas remains in the vapor phase and passes on to said second cooling stage, withdrawing from said cyclic system the solution of phenol in benzene formed in said first cooling stage and supplying to said cyclic system benzene to replace that converted in the system to benzene oxidation products and the unconverted benzene withdrawn from the cyclic system in the phenol solution from said first cooling stage.

WENDELL W. MOYER.
WILLIAM C. KLINGELHOEFER.